United States Patent [19]
Bloom

[11] Patent Number: 5,481,835
[45] Date of Patent: Jan. 9, 1996

[54] BREAKAWAY BASE AND UPPER-SEPARATION JOINT

[75] Inventor: Jeffrey A. Bloom, Silver Spring, Md.

[73] Assignee: Adian Engineering Corporation, Silver Spring, Md.

[21] Appl. No.: 34,195

[22] Filed: Mar. 19, 1993

Related U.S. Application Data

[63] Continuation-in-part of Ser. No. 693,085, Apr. 30, 1991, abandoned, which is a continuation-in-part of Ser. No. 350,881, May 12, 1989, abandoned.

[51] Int. Cl.$^6$ ............................. F04H 12/00; F01F 9/018
[52] U.S. Cl. ................... 52/98; 52/292; 248/548; 248/900; 403/2; 403/338; 404/10
[58] Field of Search ...................... 403/335, 336, 403/338, 2; 248/507, 548, 900; 52/98, 292, 298; 404/10

[56] References Cited

U.S. PATENT DOCUMENTS

| | | | |
|---|---|---|---|
| 37,929 | 3/1863 | Warner | 403/338 |
| 1,944,777 | 1/1934 | Banks | 403/2 |
| 3,091,997 | 6/1963 | Byrd | 404/10 |
| 3,307,833 | 3/1967 | Muller et al. | 256/13.1 |
| 3,499,630 | 3/1970 | Dashio | 52/98 |
| 3,628,296 | 12/1971 | Henry | 52/98 |
| 3,637,244 | 1/1972 | Strizki | 52/98 |
| 3,650,553 | 3/1972 | Wennstrom | 403/335 |
| 3,676,965 | 7/1972 | Delke | 52/98 |
| 3,866,367 | 2/1975 | Strizki | 52/98 |
| 4,154,037 | 5/1979 | Anderson | 52/98 |
| 4,269,534 | 5/1981 | Ryan | 404/10 |
| 4,270,873 | 6/1981 | Laehy et al. | 404/10 |
| 4,364,688 | 12/1982 | Bitvai | 404/10 |
| 4,378,175 | 3/1983 | Hasselqvist et al. | 256/13.1 |
| 4,610,432 | 9/1986 | Lewis et al. | 52/98 |
| 4,721,405 | 1/1988 | Loberg et al. | 403/2 |
| 4,806,046 | 2/1989 | Clark | 404/10 |
| 5,004,366 | 4/1991 | Simmons | 403/2 |

FOREIGN PATENT DOCUMENTS

| 215402 | 1/1957 | Australia | 403/293 |
|---|---|---|---|

*Primary Examiner*—Michael Safavi
*Attorney, Agent, or Firm*—David Newman & Associates

[57] ABSTRACT

A breakaway base and upper-separation joint for use with highway luminaire supports. The breakaway base, circular in cross section, has a lower-base section with a first rim, an upper-base section with a second rim, a split-ring retainer, and a perimeter band. The split-ring retainer captures the first rim of the lower-base section and the second rim of the upper-base section. The perimeter band encircles the split-ring retainer. In response to a vehicle impact with the upper-base section, the perimeter band fractures, causing disjunction of the split-ring retainer and allowing the upper-base section to separate from the lower-base section. Alternatively, the breakaway base is radial-spoked when viewed from above and has a first plurality of rims on the lower-base section, a second plurality of rims on the upper-base section, a plurality of retainer segments to engage and capture the first and second plurality of rims, and a plurality of fasteners to secure the retainer segments against the rims. In response to a vehicle impact with the upper-base section, the fasteners fracture, freeing the retainer segments and allowing the upper-base section to separate from the lower-base section. The upper-separation joint has an upper pole section, a lower pole section with a duct, fastening means for connecting the upper pole section to the lower pole section, plugging means for securing the fastening means, and separation means connected at a first end to the plugging means and at a second end, through the duct, to the lower-base section. Upon separation of the breakaway base due to vehicle impact, the separation means removes the plugging means, disengaging the fastening means and separating the upper pole section from the lower pole section.

14 Claims, 7 Drawing Sheets

Fig. 2E

BREAKAWAY BASE AND UPPER-SEPARATION JOINT

This application is a continuation-in-part of U.S. Ser. No. 07/693,085, filed Apr. 30, 1991, now abandoned, which is a continuation-in-part of U.S. Ser. No. 07/350,881, filed May 12, 1989, now abandoned.

BACKGROUND OF THE INVENTION

This invention relates to highway luminaire (lighting) supports, and more particularly to a breakaway base and an upper separation joint for highway luminaire supports or other supports that require a breakaway mechanism.

DESCRIPTION OF THE PRIOR ART

Luminaire supports located adjacent to highway surfaces are made breakaway to protect the occupants of errant vehicles. When impacted by a vehicle the support or pole separates from the foundation or from a base attached to the foundation and is propelled forward by the vehicle. As the lower point of the tall pole moves forward the pole rotates about its center of gravity and therefore the lower point rises up allowing the vehicle to pass beneath. These types of devices have been used for years, however the more recent down-sizing of passenger vehicles has made many previous designs obsolete due to potential occupant injury that can result.

A breakaway luminaire support must meet certain rigid breakaway specifications to be acceptable for use on highways. Many current luminaire supports have been shown to provide unsafe or marginal performance in impacts by mini-cars, cars weighing 1850 lb or less. The luminaire supports most likely to provide unsafe performance are the larger supports weighing over 700 lb and having a mounting height of up to 55 ft. Supports that require large amounts of energy for breakaway also are likely to provide unsafe performance. Supports that are severely damaged when impacted are not cost effective from a maintenance perspective. Current specifications call for a vehicle change in velocity of 15 ft/sec or less when a mini-car impacts a breakaway luminaire support at both 20 and 60 mph. Testing by the Federal Highway Administration showed that many types of supports which had been shown to be satisfactory for 2250 lb vehicles would not pass the acceptance tests for 1850 lb vehicles.

The most commonly used type of breakaway luminaire support uses a cast aluminum base which is bolted between the pole mounting flange and the foundation. This base is a four sided box with top and bottom open except for mounting tabs in the corners top and bottom. The base provides a breakaway feature to the support by fracturing when impacted by an automobile and thereby separating into two or more parts. The fracture requires a great deal of energy, which often exceeds the energy available from a small vehicle. This type of base has been in use for several decades and is popular because it prevents excessive damage to the pole and is easily replaceable when impacted.

Another type of breakaway luminaire support is called a slip base. The slip base consists of a special slotted flange for the bottom of the pole and a mating flange attached to the foundation. The flanges have three or more open slots on their outer edges. These slots are used for mounting bolts which are tightened to clamp the two flanges together. A thin sheet metal plate with holes to match the bolt locations is placed between the flanges to prevent movement of the bolts due to wind vibration. The bolts shear through this plate when the pole is impacted and separation occurs. Separation occurs due to ejection of the bolts from the slots when the pole is impacted and the two flanges move relative to one another. This type of base provides good breakaway performance but is not widely used. Since there is no replaceable base, direct impact of the vehicle with the pole wall can lead to local deformation, requiring replacement of the costly pole. This type of base has also not been available on aluminum poles which are popular because of low maintenance and aesthetics.

Breakaway couplings are used between the pole mounting flange and the foundation to provide breakaway performance for some luminaire supports. These coupling are made of aluminum and are threaded top and bottom. Usually four couplings are used for a single installation. The couplings fracture when the pole is impacted by a vehicle. Due to high fracture energy, these devices usually have not performed well in impact tests with small cars. Pole deformation similar to that found in slip base poles also occurs.

Progressive shear bases utilize the shearing action of rivets during the base breakaway. The base is a thin sheet metal box like structure which is usually integral with the pole. The base flange in-turn is attached to the foundation. The sheet metal base is attached to the flange with a series of rivets around the outer perimeter. When impacted by a vehicle, the base crushes and allows the rivets to shear in a progressive fashion from impact side to opposite side. This design is a proprietary concept which is only manufactured by a single manufacturer. Damage to the thin walled poles usually occurs in breakaway impacts when the base is crushed or the pole impacts the ground.

Prior art devices may not breakaway at low force levels and move easily away from the vehicle after breakaway, meeting all requirements for performance in impacts by mini-cars.

OBJECTS AND SUMMARY OF THE INVENTION

An object of the present invention is to provide a breakaway base and upper separation joint for use with highway luminaire supports.

Another object of the present invention is to provide a breakaway base and upper separation joint which breakaway at low force levels in impacts by automobiles.

A further object of the invention is to provide an upper-separation joint that separates in response to a breakaway at the base of a luminaire support.

A still further object of the invention is to provide a breakaway base and upper-separation joint that operate cooperatively in response to being hit by a small car.

According to the present invention as embodied and broadly described herein, a breakaway base is provided for use with highway luminaire supports. The breakaway base comprises a lower-base section, an upper-base section, a split-ring retainer, and a perimeter band. The lower-base section has a first rim at its upper edge. The upper-base section has a second rim at its lower edge. The split-ring retainer, having a circumferential groove on its inner surface for engaging the two rims, "locks" the first and second rims together. Finally, the perimeter band holds the split-ring retainer against the two rims of the upper-base and lower-base sections. In response to an impact by a vehicle, the perimeter band fails, allowing disjunction of the split-ring retainer and thus making it possible for the upper-base section to separate from the lower-base section.

The present invention also includes an upper-separation joint comprising an upper pole section, a lower pole section, fastening means, plugging means, and separation means. The upper pole section is connected to a mast arm which supports a highway luminaire. The lower pole section has a duct and is connected to the upper-base section. The fastening means is mounted on the inner surfaces of the two pole sections for connecting the upper pole section to the lower pole section. The plugging means inserts into the upper and lower pole sections at their point of juncture to secure the fastening means during normal operation of the pole. The separation means connects between the plugging means and the lower-base section through the duct. When subjected to excessive horizontal loading, such as that experienced upon a vehicle's hitting the upper-base section and separating the upper-base section from the lower-base section, the separation means exerts a downward pull on the plugging means. In response to this downward pull, the plugging means is released from the fastening means mounted on the inner surface of the pole sections. Once so released, the upper pole section is no longer connected to the lower pole section and, as a result, these two pole sections separate from one another.

Additional objects and advantages of the invention are set forth in part in the description which follows, and in part are obvious from the description, or may be learned by practice of the invention. The objects and advantages of the invention also may be realized and obtained by means of the instrumentalities and combinations particularly pointed out in the appended claims.

BRIEF DESCRIPTION OF THE DRAWINGS

The accompanying drawings, which are incorporated in and constitute a part of this specification, illustrate a preferred embodiment of the invention, and together with the description, serve to explain the principles of the invention.

FIG. 2E shows a section view of an alternative embodiment of the alternate breakaway base;

DETAILED DESCRIPTION OF THE PREFERRED EMBODIMENTS

Reference is now made to the present preferred embodiments of the invention, examples of which are illustrated in the accompanying drawings, wherein like reference numerals indicate like elements throughout the several views.

Figure 1:
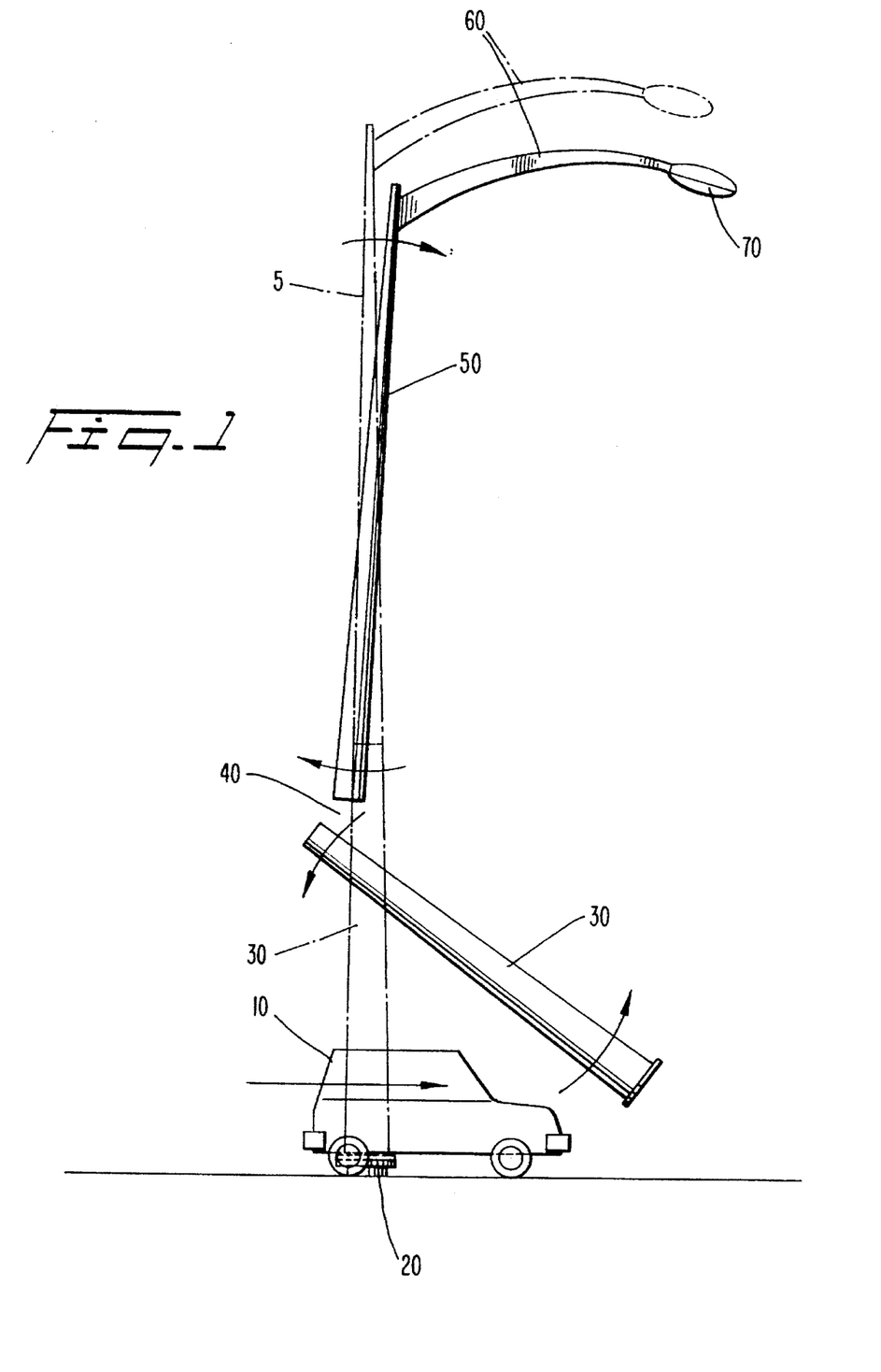
FIG. 1 shows the luminaire support having an upper-separation joint and breakaway base.

In the exemplary arrangement shown in FIG. 1, a highway luminaire is depicted with support 5 having a mast arm 60 and a luminaire 70. The highway luminaire support 5 normally is used for providing the necessary support for having a luminaire 70 light a highway or other area. Also shown are a breakaway base 20, vehicle 10, lower pole section 30, upper pole section 50, and upper-separation joint 40. As shown in FIG. 1, the present invention has two aspects, the breakaway base 20 and the upper-separation joint 40, which may be used cooperatively as one complete apparatus.

The Breakaway Base

Figures 2A, 2B:
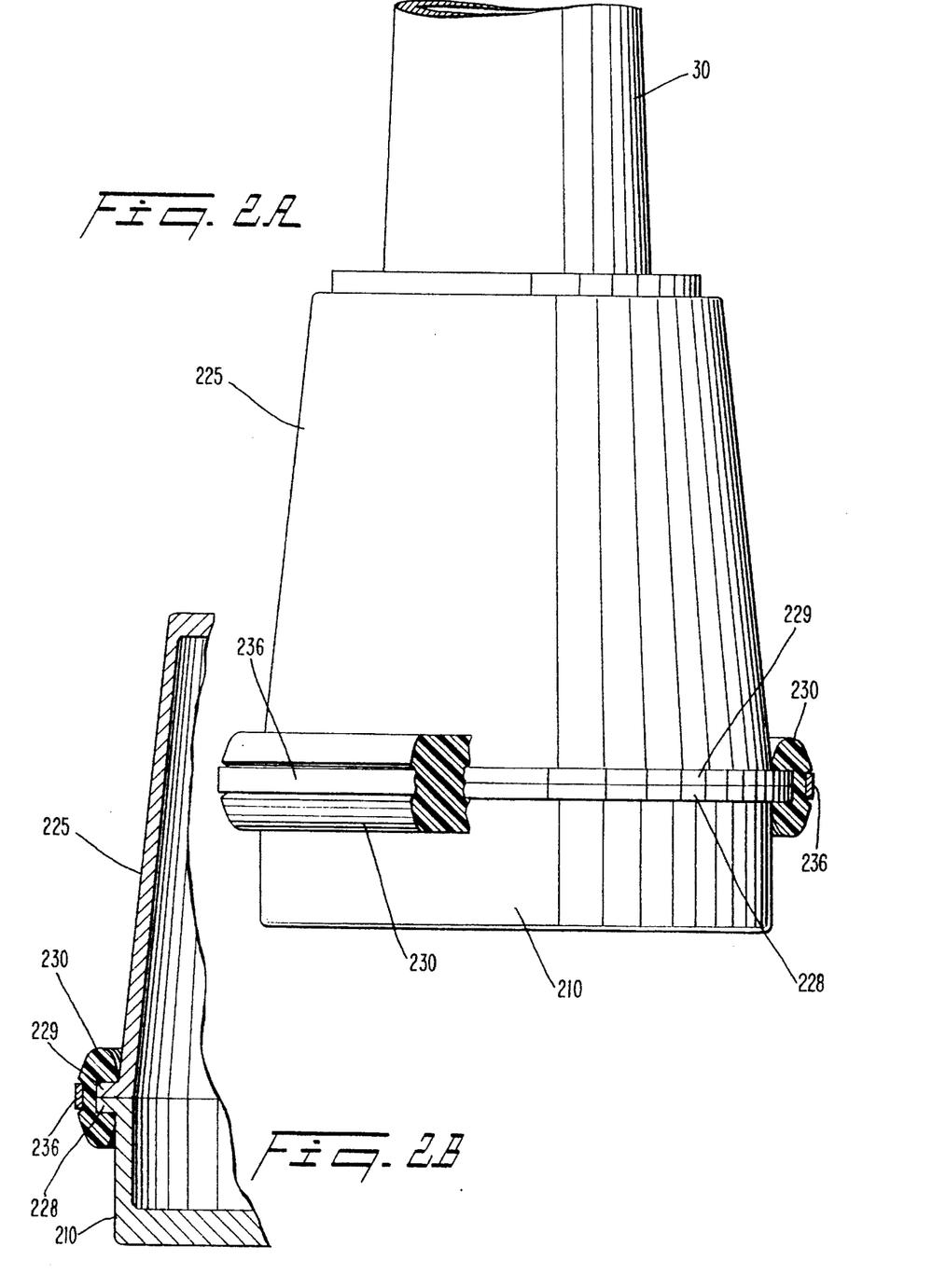
FIG. 2A shows a breakaway base with a split-ring retainer and perimeter band.
FIG. 2B shows a section view of the breakaway base with the split-ring retainer and perimeter band.

FIG. 2A illustrates a preferred embodiment of a breakaway base having a lower-base section 210, an upper-base section 225, upper-base rim 229, lower-base rim 228, split-ring retainer 230 in several segments, perimeter band 236, and lower pole section 30 attached to the upper-base section 225. A section view, FIG 2B, is shown illustrating the upper-base section 225 having an upper-base rim 229, and the lower-base section 210 having a lower-base rim 228 for engagement with the split-ring retainer 230. Means for securing connection of the upper-base section 225 to the lower-base section 210 is shown, and may be embodied as a split-ring retainer 230. The perimeter band 236 wraps around the segments of the split-ring retainer 230 to hold them in contact with the upper-base rim 229 and the lower-base rim 228.

The lower-base section 210 is bolted to a foundation or other rigid structure that is at, or close to, ground level. The lower-base section 210 can be approximately 2 to 4 inches in height above the foundation. The lower-base section 210 is round when viewed from above and includes provisions for mounting to the foundation by use of studs or bolts. Although the upper-base section 225 and the lower-base section 210 are round in the preferred embodiment, other cross-sectional shapes can be used.

The upper-base section 225 is a cylindrical or conical section which attaches to the base flange of the lower pole section by the use of bolts or other means. The upper-base section 225 can also be an integral part of the lower pole section 30. The upper-base section 225 is open on the inside to allow for the passage of cables and wires.

Two base perimeter rims 228, 229, fastened together by the use of a breakaway ring, band, clamp or other means, connect the upper-base section 225 to the lower-base section 210. In the preferred embodiment, the connection is made by use of a first rim 228 on the upper edge of the lower-base section 210 and a second rim 229 on the lower edge of the upper-base section 225. These two rims are held together by a split-ring retainer 230.

The split-ring retainer 230 is made in two or more curved segments with a circumferential groove on the inner surface of these segments. This circumferential groove acts to engage and capture the two base perimeter rims 228, 229. In the preferred embodiment, the split-ring retainer is a metallic device. Alternatively, the split-ring retainer could be made from other substances such as plastic. The split-ring retainer segments are held in contact against the first and second base perimeter rims by a perimeter band 236.

The perimeter band 236 is a thin sheet metal band, ring, or cable made from stainless steel, aluminum or carbon steel and sized to fail under a shear loading condition. The perimeter band 236 is joined by a connector or welded, riveted or mechanically joined to form a continuous band. The perimeter band 236 encircles the split-ring retainer 230, securing the retainer against the two base perimeter rims 228, 229. During times of normal loading, the perimeter band ensures the integrity of the connection between the upper-base section 225 and the lower-base section 210. As an alternate, fasteners such as screws or rivets may be used in place of the perimeter band to secure the split-ring retainer segments to the rims.

Figure 2C:
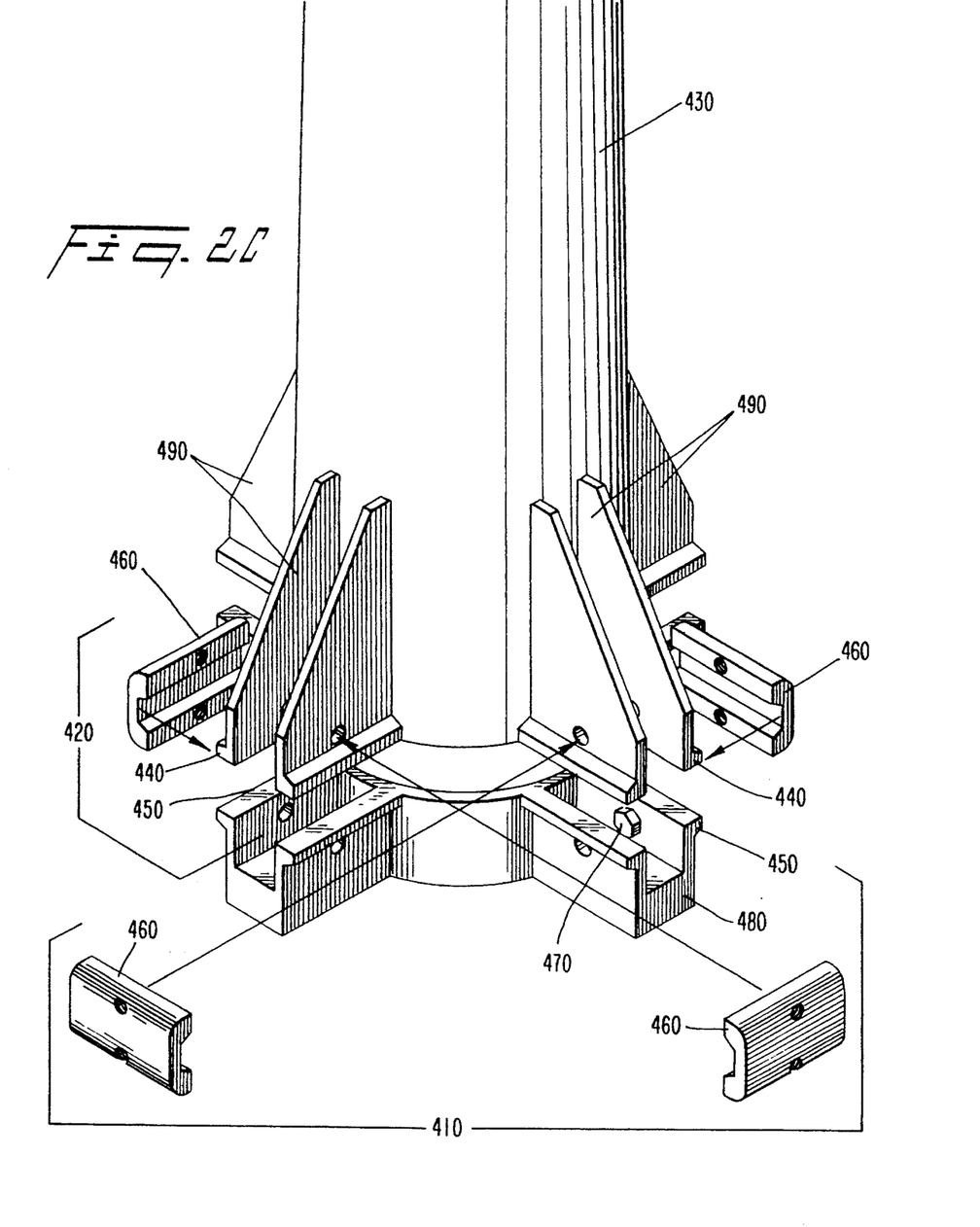
FIG. 2C shows an alternate breakaway base, cross-like in shape instead of round, with retainer segments and clips.

FIG. 2C illustrates an alternate breakaway base including a lower-base section 410 having lower-base spokes 480 with rims 450, an upper-base section 420 having upper-base spokes 490 with rims 440, a highway luminaire support pole 430, retainer segments 460, and fasteners 470.

Figure 2D:
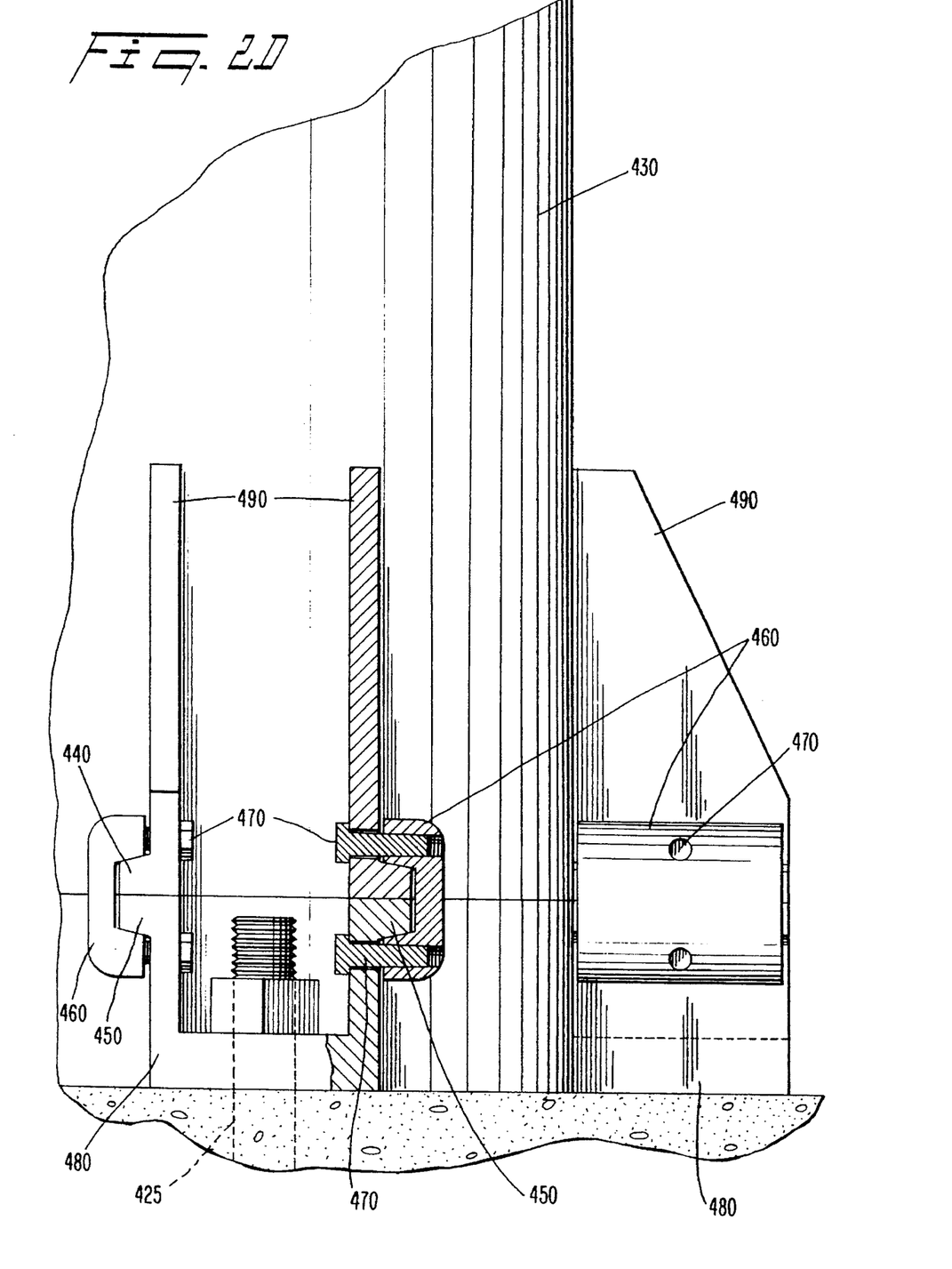
FIG. 2D shows a section view of the alternate breakaway base, radial-spoked in shape instead of round, with retainer segments and fasteners.

The lower-base section 410 is radial-spoked in shape instead of round. The lower-base section 410 consists of not less than three spokes 480 which emanate radially from the center. Each spoke 480 has two upper faces, both of which extend horizontally to form two rims 450 on the two upper edges of the spoke. The upper-base section 420 is similar in shape to the lower-base section 410. The upper-base section 420 consists of not less than three spokes 490 which are attached to the pole 430. Each upper-base section spoke 490 has two lower faces which extend horizontally to form two rims 440 on the two lower edges of the spoke. The location of the lower-base section spokes 480 corresponds with the location of the upper-base section spokes 490. The retainer segments 460 engage and capture the rims 440 on the upper-base section spokes 490 and the rims 450 on the lower-base section spokes 480. The fasteners 470 hold the retainer segments 460 against the captured rims 440, 450. A section view, FIG. 2D, is shown illustrating the upper-base section spokes 490 with rims 440, and the lower-base section spokes 480 with rims 450, for engagement with the retainer segments 460. FIG. 2D shows the fasteners 470 that hold the retainer segments 460 tight against the rims 440, 450. FIG. 2D also shows the luminaire support 430 and the foundation anchor bolt 425.

In operation, this alternate design works in the same manner as the previously described design except that under vehicle impact load, the fasteners 470 fail, releasing the retainer segments 460 and allowing the upper-base section 420 to separate from the lower-base section 410.

The preferred embodiment of the alternate design, fasteners 470 are used to hold the retainers in place and to fail when a vehicle impact occurs. Any method for holding the retainers in place, including screws, rivets, clips or clamps, that will produce the desired result is acceptable.

The alternate design may also be embodied as illustrated in FIG. 2E wherein the upper-base section spokes 490 are separated from the pole 430 and are bolted to the pole by use of bolts 435 which connect to the base plate 445. Also shown are the foundation anchor bolts 425, the lower-base section spokes 480 with rims 450, and fasteners 470.

Figure 3:
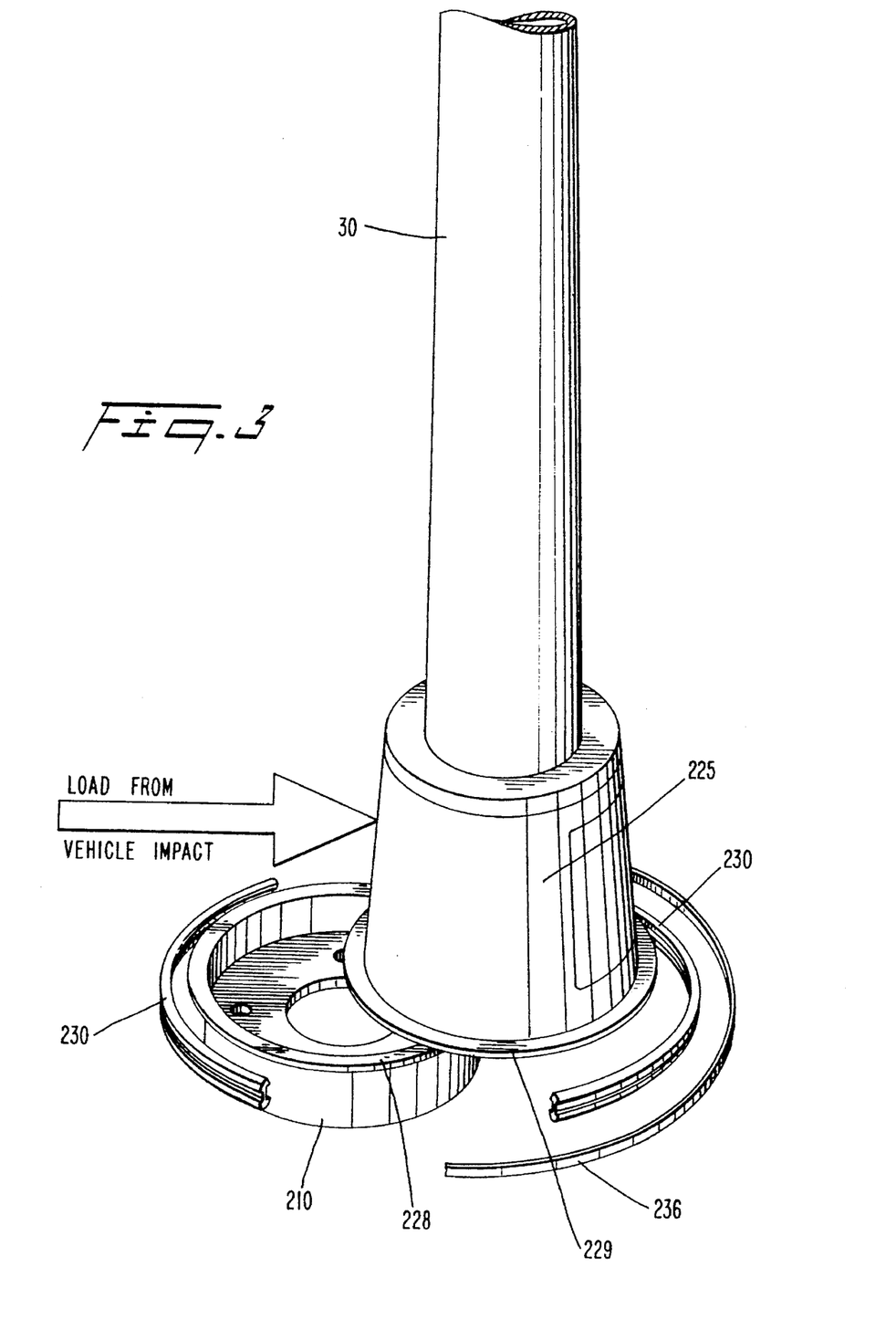
FIG. 3 illustrates a breakaway base after breakaway showing separated split-ring retainer and base section separation.

FIG. 3 illustrates a breakaway base after breakaway showing broken perimeter band 236, separated split-ring retainer 230, and separation of the upper-base section 225 from the lower-base section. As shown in FIG. 3, the upper-base section 225 with the upper-base rim 229 and attached lower pole section 30 has been separated from the lower-base section 210 with lower-base rim 228.

During times of normal vertical loading, the perimeter band 236 ensures the integrity of the connection between the upper-base section 225 and the lower-base section 210. When subjected to unusual horizontal loading, such as that caused by vehicle impact with the upper-base section 225, the perimeter band 236 fractures, releasing the split-ring retainer segments and allowing the upper-base section to separate from the lower-base section at the juncture of the two base perimeter rims 228, 229. In the post-impact period shown in FIG. 3, the split-ring retainer segments 230 have been released due to failure of the perimeter band 236. As a result of the perimeter band failure, the lower pole section 30 and the upper-base section 225 have been allowed to separate from the lower-base section 210.

The breakaway base provides sufficient strength to prevent blow-over of the support from environmental loadings such as wind, ice and from dead loads imposed by the offset luminaire support arm (mast arm). The load couple in the base is transferred from the upper-base section to the lower-base section through the base rims and capturing split-ring retainer in the preferred embodiment. Sufficient contact area is provided to transfer all possible loadings. When impacted by an automobile, a shearing condition exists between the upper-base and lower-base sections. This shearing is resisted by the perimeter band which is put into tension around its perimeter. The perimeter band fractures when the hoop tensile stress level exceeds the capabilities of the perimeter band material. The split-ring retainer and perimeter band combination provides the capability to transfer environmental loads on the pole while still breaking away at low force levels because of the differences in the nature of the loadings that occur under these two situations. When environmentally loaded, the loads are predominantly vertical on the split-ring retainer and perimeter band. A vehicle impact, by contrast, loads the perimeter band predominantly in the horizontal (hoop) direction. Thus the split-ring retainer and perimeter band can be strong in the vertical loading direction while the perimeter band fractures at low force levels in the horizontal loading direction.

In the alternate arrangement employing fasteners instead of a perimeter band, the fasteners are sized such that they are capable of holding the retainers firmly in place under normal loading conditions. When the upper-base section is subject to impact from a vehicle, however, the shear loading created thereby would force the retainers outward and cause the fasteners to fail.

The function served by the split-ring retainer and perimeter band in the primary arrangement, or by the fasteners and retainers in the alternate arrangement, can be accomplished by any other device which connects the upper-base and lower-base sections and provides a strong vertical load capability while also offering weak resistance to shear movement between the sections. The upper-base and lower-base sections can be held together by individual clamps placed at various positions around the edge of the mating rims on the upper-base and lower-base sections. The upper-base and lower-base sections can also be joined by a band which fits into a perimeter groove on interlocking tabs of both base sections.

In operation the breakaway base, including the lower-base section, the upper-base section, the retainer segments, and the perimeter band or fasteners, is responsive to horizontal loading such as that imposed by vehicle impact with the upper-base section. When subjected to such horizontal loading, the breakaway base responds through the fracturing of the perimeter band or fasteners and the release of the retainer segments which allows separation of the lower-base section from the upper-base section.

The Upper-Separation Joint

A second aspect of the present invention is the upper-separation joint which can work cooperatively with the breakaway base. The upper-separation joint reduces the energy required to propel, i.e., to translate and rotate to clear the vehicle, a luminaire support when it has been impacted and separated at its base or foundation. The energy is reduced because only the lower pole section is propelled, while the upper pole section remains relatively still momentarily and then falls downward. Since the lower pole section is necessarily lighter and shorter than the entire pole, it has less resistance to translation and rotation when being pushed by a vehicle at its base. This in turn reduces the velocity reduction experienced by the vehicle when propelling the pole while continuing through the impact zone. The particular design of the separation means which causes joint separation is not important in this concept. The only criteria is that the joint remain together and resist environmental loadings until separation of the pole occurs at its base or foundation.

The upper-separation joint is placed in a breakaway luminaire support at a height above the roof of most or all vehicles. The joint is activated upon breakaway of the upper-base section from the lower-base section and foundation when impacted by a vehicle. The upper-separation joint provides a complete separation of the upper pole section from the lower pole section. The two sections also may be tethered together or joined by some type of joint which allows relative movement between the two sections.

The upper-separation joint comprises an upper pole section, a lower pole section, fastening means, plugging means, and separation means. The fastening means connect the lower pole and upper pole sections. The plugging means inserts into the upper and lower pole sections at their point of juncture to secure the fastening means. The separation means attaches from the foundation of the highway luminaire support, through the lower pole section, to the plugging means.

The upper pole section is connected near its top to the mast arm, which serves to suspend the luminaire above the road surface. The base of the upper pole section is connected to the lower pole section at the upper-separation joint.

The lower pole section is connected to the upper pole section at the upper-separation joint. The base of the lower pole section is mounted to the upper-base section by the use of bolts or other means. The lower pole section can also be an integral part of the upper-base section. The lower pole section has a duct to allow the running of cable or other connections between the upper pole section and the foundation of the highway luminaire support.

Fastening means to connect the upper pole section to the lower pole section is mounted on a lower inner surface of the upper pole section and on an upper inner surface of the lower pole section. This fastening means serves to "lock" the upper pole to the lower pole and is held in place by engagement means. Fastening means may be embodied as at least two tie plates and is so embodied in the preferred embodiment. Alternatively, the fastening means may be embodied as clamps. The engagement means may be embodied as pins and is so embodied in the preferred embodiment. Alternatively, the engagement means may be embodied as inner circumferential rims or as notches formed between pins or as notches formed between inner circumferential rims.

Plugging means is inserted into the hollow interior of the upper pole section and into the hollow interior of the lower pole section to secure the fastening means. The plugging means keeps the fastening means snug against the engagement means mounted on the interior walls of the upper and lower pole sections. The plugging means may be embodied as a tube segment or plug and is so embodied in the preferred embodiment. The plugging means is connected to the breakaway base and foundation by separation means.

Separation means is connected between the plugging means and the foundation of the highway luminaire support via the duct in the lower pole section. The separation means enables the upper-separation joint to act cooperatively with the breakaway base. When subjected to increased tension at its lower foundation connection, the separation means automatically applies increased tension to its upper plugging means connection. The increased tension on the plugging means activates the upper-separation joint. The separation means may be embodied as a cable and is so embodied in the preferred embodiment. Activation of the upper-separation joint can also be controlled by any other separation means which will provide a load or signal to indicate there has been a division between the upper-base section and lower-base section.

Figure 4:
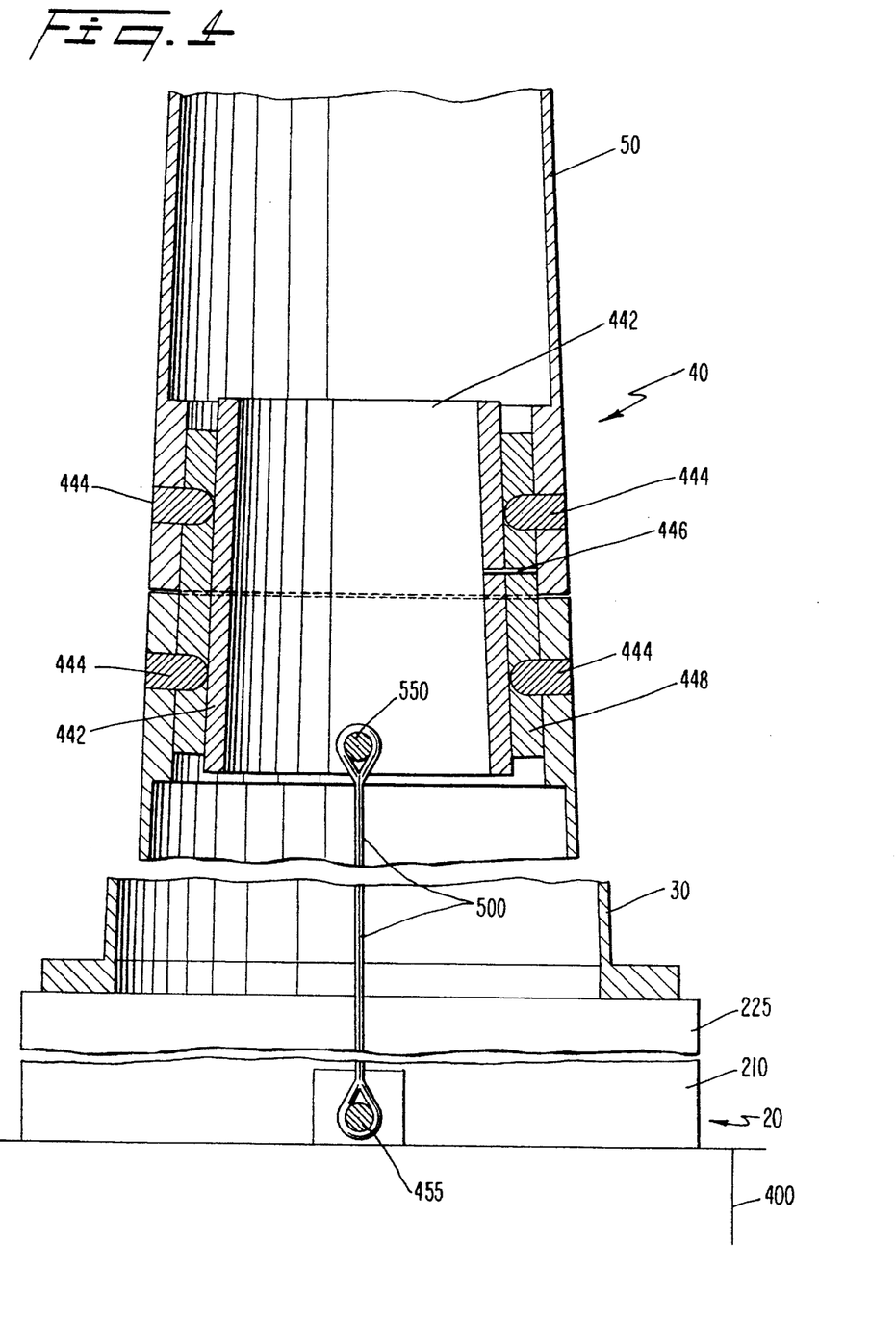
FIG. 4 shows a section view of a luminaire support pole with an upper-separation joint.

The preferred embodiment of the upper-separation joint is illustrated in the exemplary arrangement of FIG. 4 showing a luminaire support pole with an upper-separation joint 40. FIG. 4 illustrates an upper pole section 50 and a lower pole section 30 connected by a tube segment or plug 442. The tube segment or plug 442 is connected to the foundation 400 by a cable 500 passing through the lower pole section 30 and into the lower-base section 210. The cable 500 is attached to the foundation through the anchor assembly 455. The tube segment or plug 442 holds in place at least two tie plates 448 that connect the upper pole section 50 to the lower pole section 30. These tie plates span between the upper pole and lower pole sections and engage pins 444 that protrude inward from the inner walls of both pole sections, as illustrated in cross section FIG. 4. Finally, the tube segment or plug 442 is secured by a shear pin 446, and the cable 450 is connected to the tube segment or plug 442 by a pin 550.

In operation the upper-separation joint, including the lower-base section, the upper-base section, the lower pole section, the upper pole section, the fastening means, the base breakaway mechanism, the plugging means, and the separation means, is responsive to the upper-base section separating from the lower-base section. When the upper-base section separates from the lower-base section, horizontal tension is applied to the separation means. In response to this horizontal tension, the separation means pulls downward on the plugging means, removing the plugging means from the upper pole section. In the absence of the plugging means, which serves to secure the fastening means, the fastening means becomes disengaged and the lower pole section is free to separate from the upper pole section.

In operation of the preferred embodiment as shown in FIG. 4, the upper-separation joint 40 is responsive to the separation of the upper-base section 225 from the lower-base section 210 of breakaway base 20 and foundation 400. Separation of the upper-base section from the lower-base section results in increased tension on the cable 450 at its lower connection. In response to this increased tension, the cable pulls on the tube segment or plug 442. The shear pin 446 shears off when the cable pulls on the tube segment or plug 442, allowing the tube segment or plug to be moved. The downward pull on the tube segment or plug 442 removes the tube segment or plug from the upper pole section 50 and draws the tube segment or plug downward below the level of the tie plates 448. The drop of the tube segment or plug 442 below the level of the tie plates causes the tie plates 448 to become unrestrained and to fall away from the pins 444 due to gravity and due to the reactive force of the motion of the upper pole section and the lower pole section on the tie plates. In the absence of any remaining connecting means, the lower pole section 30 is free to become disconnected from the upper pole section 50.

The breakaway base and the upper-separation joint of the present invention may be used cooperatively, with separation of the breakaway base triggering separation of the upper pole section from the lower pole section. The breakaway base and the upper-separation joint also may be used independently. The upper-separation joint may also be used with other types of breakaway bases.

It will be apparent to those skilled in the art that various modifications can be made to the breakaway base and the upper-separation joint of the instant invention without departing from the spirit or scope of the invention, and it is intended that the present invention cover modifications and variations of the breakaway base and upper-separation joint provided that they come within the scope of the appended claims and their equivalents.

I claim:

1. A breakaway base for a highway luminaire support, comprising:

a lower-base section having a radial-spoked shape with a first plurality of spokes when viewed from above, with a first plurality of rims on a side of each of the first plurality of spokes along an upper edge;

an upper-base section having a radial-spoked shape with a second plurality of spokes when viewed from above with a second plurality of rims on a side of each of the second plurality of spokes along a lower edge matching the positions of the first plurality of rims on the lower-base section;

a plurality of retainer segments, each of said plurality of retainer segments having a C-shaped cross-section, engaging and capturing the first and second plurality of rims and preventing relative vertical motion of the first and second plurality of rims; and holding means, fastened through the plurality of retainer segments, for securing the plurality of retainer segments against the first and second plurality of rims, said holding means, responsive to horizontal loading, releasing the plurality of retainer segments unbroken, separating the upper-base section from the lower-base section.

2. The breakaway base as set forth in claim 1 wherein said first plurality of rims is fixedly connected to said lower-base section and said second plurality of rims is fixedly connected to said upper-base section.

3. A breakaway base for a highway luminaire support, comprising:

a lower-base section having a radial-spoked shape with a first plurality of spokes when viewed from above;

an upper-base section having a radial-spoked shape with a second plurality of spokes when viewed from above, the second plurality of spokes similar to and corresponding in position to the first plurality of spokes of the lower-base section;

a first plurality of rims on a side of each of the first plurality of spokes on the upper edge of the lower-base a second plurality of rims on a side of each of the second plurality of spokes on the lower edge of the upper-base section, the location of said second plurality of rims corresponding to the location of said first plurality of rims;

a plurality of retainer segments, each of said plurality of retainer segments having a C-shaped cross-section, engaging and capturing said first plurality of rims and said second plurality of rims and preventing relative vertical motion of said first plurality of rims and said second plurality of rims; and holding means, fastened through said plurality of retainer segments, for clamping said plurality of retainer segments into engagement with said first plurality of rims and said second plurality of rims, said holding means, responsive to horizontal loading, for releasing said plurality of retainer segments, said plurality of retainer segments falling away unbroken, and the upper-base section separating from the lower-base section.

4. A breakaway base having an upper rim fixedly connected to said breakaway base, for use with a highway luminaire support having a lower rim fixedly connected to said highway luminaire support, in which the upper rim is held in contact with the lower rim by a retainer having a C-shaped cross-section which engages and captures the upper rim and the lower rim and which is held in firm contact with the upper rim and the lower rim by shear pins which fail and release the retainer from contact with the upper rim and the lower rim upon horizontal loading.

5. An upper-separation joint for use with a highway luminaire support having an upper-base section and a lower-base section mounted to a foundation which separate when impacted by a vehicle, said upper-separation joint comprising:

a hollow upper pole section;

a hollow lower pole section connected to the upper-base section;

a series of tie plates engaging a lower inner surface of said hollow upper pole section and engaging an upper inner surface of said hollow lower pole section, connecting said hollow upper pole section to said hollow lower pole section; and means, responsive to vehicle impact with said highway luminaire support, for releasing said series of tie plates and separating said upper pole section from said lower pole section, said releasing means including:

a plug, inserted into said hollow upper pole section and into said hollow lower pole section, securing said series of tie plates engaging both the hollow upper pole section and the hollow lower pole section; and a non-elastic cable connected to said plug and, responsive to horizontal loading, pulling said plug through the hollow lower pole section and releasing said series of tie plates.

6. A breakaway highway luminaire support, comprising:

a breakaway base having an upper-base section and a lower-base section;

a hollow lower pole section connected to said upper-base section;

a hollow upper pole section;

a series of tie plates inside the hollow upper pole section and the hollow lower pole section engaging a lower edge of the hollow upper pole section and an upper edge of the hollow lower pole section;

a plug inserted into said hollow upper and lower pole sections holding the tie plates from disengaging with said upper and lower pole sections; and a non-elastic cable connected at a first end to the plug and at a second end, through the hollow lower pole section, to the lower-base section, said cable pulling said plug away from said tie plates upon breakaway of said breakaway base, thereby allowing said upper pole section to separate from said lower pole sections.

7. The breakaway highway luminaire support as set forth in claim 6, said breakaway base further comprising:

a first set of rims integral to a top of the lower-base section;

a second set of rims integral to a bottom of the upper-base section;

a series of retainer segments, each retainer segment having a C-shaped cross-section, engaging the first set of rims and the second set of rims; and a series of fasteners securing and holding said series of retainer segments in physical contact with the first set of rims and the second set of rims and, responsive to vehicle impact with said breakaway highway luminaire support, releasing said series of retainer segments to fall unbroken from said first set of rims and said second set of rims and separating the upper-base section from the lower-base section.

8. A breakaway base for a highway said breakaway base including a lower-base section having a radial-spoked shape when viewed from above, with a first plurality of rims at a plurality of upper edge points and an upper-base section having a radial-spoked shape when viewed from above, with a second plurality of rims at a plurality of lower edge points, the position of the plurality of lower edge points matching the position of the plurality of upper edge points, said first plurality of rims and said second plurality of rims held in contact with one another by retainer segments having a C-shaped cross-section engaging and capturing said first plurality of rims and said second plurality of rims, said retainer segments being held in contact with said first plurality of rims and said second plurality of rims by fastening means, said fastening means, responsive to external horizontal loading, failing and releasing said retainer segments, said fastening means including a plurality of horizontally-oriented bolts, or a plurality of horizontally-oriented screws, or a plurality of horizontally-oriented rivets, or a plurality of horizontally-oriented shear pins.

9. A breakaway highway support comprising a breakaway base having at least one pair of upper and lower rims, said pair of upper and lower rims attached to upper-base and lower-base sections of said breakaway highway support, respectively, said pair of upper and lower rims held in contact with one another by retainer segments having a C-shaped cross-section engaging and capturing said pair of upper and lower rims, said retainer segments being held in contact with said pair of upper and lower rims by fastening means, said fastening means, responsive to external horizontal loading, failing and releasing said retainer segments, said breakaway highway support further comprising:

a hollow lower pole section connected to the upper-base section;

a hollow upper pole section;

means, mounted on a lower inner surface of said hollow upper pole section and on an upper inner surface of said hollow lower pole section, for fastening the upper pole section and the lower pole section;

means, inserted into said hollow upper pole section and into said hollow lower pole section, for plugging a portion of said hollow upper pole section and a portion of said hollow lower pole section, and for engaging said fastening means with the lower inner surface of said hollow upper pole section and with the upper inner surface of said hollow lower pole section;
and means, connected at a first end to said plugging means and at a second end, through the hollow lower pole section to the lower-base section, for removing, responsive to vehicle impact with the breakaway base, said plugging means, releasing said fastening means, and separating said upper pole section from said lower pole section.

10. A breakaway highway luminaire support, comprising:

a hollow upper pole section;

a hollow lower pole section;

a breakaway base;

means for fastening the upper pole section to the lower pole section;

plugging means, inserted into said hollow upper pole section and into said hollow lower pole section, engaging said fastening means with said hollow upper pole section and with said hollow lower pole section; and separation means, connected at a first end to said plugging means and connected at a second end, through the hollow lower pole section, to said breakaway base, removing, responsive to vehicle impact with said breakaway base, the plugging means, releasing the fastening means, and separating the upper pole section from the lower pole section.

11. A breakaway highway luminaire support, comprising:

a hollow upper pole section;

a hollow lower pole section;

a breakaway base;

a plurality of interior tie plates connecting the upper pole section to the lower pole section;

a plug, inserted into said hollow upper pole section and into said hollow lower pole section, engaging said plurality of tie plates with the hollow upper pole section and with the hollow lower pole section;

a shear pin securing, in the absence of vertical load, said plug and shearing, responsive to vertical load, to release said plug; and a non-elastic cable, connected at a first end to said plug and connected at a second end, through the hollow lower pole section, to the breakaway base, said cable removing, responsive to vehicle impact, said plug by shearing said shear pin, releasing said plurality of tie plates and separating the hollow upper pole section from the hollow lower pole section.

12. The breakaway highway luminaire support as set forth in claim 10 or 11, said breakaway base further comprising:

a lower-base section having a radial-spoked shape with a first plurality of spokes when viewed from above, with a first plurality of rims along both sides of each of the first plurality of spokes at upper edge points;

an upper-base section having a radial-spoked shape with a second plurality of spokes when viewed from above, with a second plurality of rims along both sides of each of the second plurality of spokes at lower edge points, the position of the lower edge points matching the position of the upper edge points;

a plurality of retainer segments, each of said plurality of retainer segments having a C-shaped cross-section, engaging and capturing the first plurality of rims and the second plurality of rims and preventing relative vertical motion between said first plurality of rims and said second plurality of rims; and means for holding the plurality of retainer segments in engagement with the first plurality of rims and the second plurality of rims and, responsive to vehicle impact, for releasing the plurality of retainer segments, allowing them to fall away from the rims unbroken, separating the lower-base section and the upper-base section.

13. The breakaway highway luminaire support as set forth in claim 10 or 11, the breakaway base further comprising:

a lower-base section having a first set of at least three identical radial spokes, emanating from a center, each radial spoke of the first set having a first pair of rims along both sides of each spoke;

an upper-base section having a second set of at least three identical radial spokes, emanating from a center, each radial spoke of the second set having a second pair of rims along both sides of each spoke and each radial spoke of the second set matching a position of a radial spoke of the first set;

a series of at least six identical retainer segments, each of said identical retainer segment having a C-shaped cross-section, said series of retainer segments engaging and capturing the first pair of rims and the second pair of rims preventing relative vertical motion of said first pair of rims and said second pair of rims; and a plurality of shear pins holding said series of retainer segments against the first pair of rims and the second pair of rims and, responsive to vehicle impact, shearing and releasing said series of retainer segments to fall unbroken from the rims, separating the lower-base section and the upper-base section.

14. The breakaway highway luminaire support as set forth in claim 10 or 11 the breakaway base further comprising:

a lower-base section having a circular cross-section with a first rim at an upper edge of the lower-base section, the first rim having a larger diameter than the lower-base section;

an upper-base section having a circular cross-section with a second rim at a lower edge of the upper-base section, for interfacing to the first rim;

a split-ring retainer having at least two curved segments with a circumferential groove on an inner surface for engaging and capturing the first rim of the lower-base section and the second rim of the upper-base section; and a perimeter band encircling said split-ring retainer for holding said split-ring retainer against said first rim and said second rim during periods of vertical tension loading and, responsive to horizontal tension loading, for fracturing and releasing said split-ring retainer.

* * * * *